April 5, 1938.  W. F. ZIMMERMANN  2,113,124
DEFLECTION COMPENSATOR
Filed April 21, 1936  2 Sheets-Sheet 1

INVENTOR
William F. Zimmermann
BY
Albert F. Nathan
ATTORNEY

April 5, 1938. W. F. ZIMMERMANN 2,113,124
DEFLECTION COMPENSATOR
Filed April 21, 1936 2 Sheets-Sheet 2
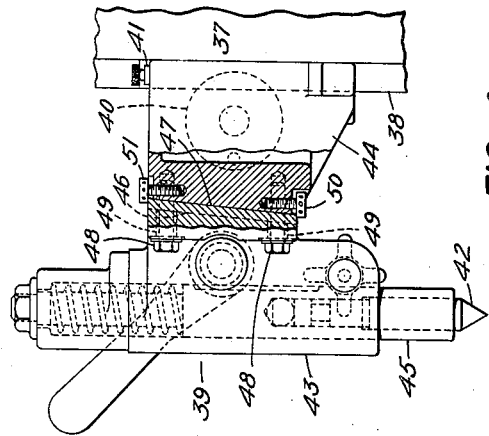
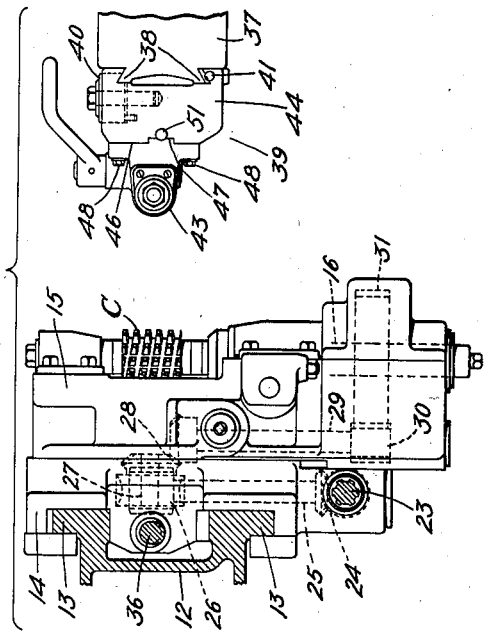
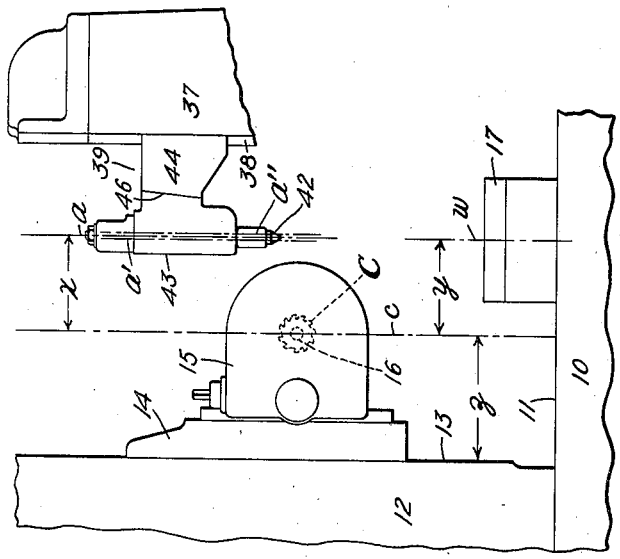
INVENTOR
William F. Zimmermann
BY
Albert F. Nathan
ATTORNEY Patented Apr. 5, 1938

2,113,124

UNITED STATES PATENT OFFICE 2,113,124

DEFLECTION COMPENSATOR

William F. Zimmermann, Maplewood, N. J., assignor to Gould & Eberhardt, Newark, N. J., a corporation of New Jersey Application April 21, 1936, Serial No. 75,547

2 Claims. (Cl. 90—1)

This invention relates to machine tools in general and particularly to machines of the type ordinarily used for the cutting of gears and splined shafts.

The hobbing of gears comprises rotating a cutter, the teeth of which are arranged in a helix and conform in cross-section to the shape of the teeth upon the gears to be cut, in engagement with and in timed relation with a rotating gear blank. The cutter and the gear rotate on transverse axes and simultaneously are given a relative feed movement in the direction of the axis of the teeth or splines being cut. In setting up the machine, the cutter assumes a position relative to the gear blank such that the pitch circle of a section of the hob or cutter coincides with the pitch circle of the gear proposed to be cut. The feed movement is then started and the cutter is gradually fed into the work while the latter is turning at a speed corresponding to the helix of the hob. In the course of one revolution of the work blank, the hob has cut a portion of every tooth or spline on the blank. At the beginning of the cut the total cutting pressure is relatively light, but as the cutter feeds into the work, the cutting forces gradually increase until the maximum depth cut is reached, which is also the full depth of the tooth, and thereafter the load remains more or less constant.

The load on the machine elements induced by the cutting pressure creates certain stresses in the parts which are not present when the machine is idle or being set up and in consequence there occurs a certain amount of deflection or yield in parts sufficient to cause deformation in shape and size of the gear being cut.

In certain types of gear cutting machines, and the one herein disclosed is typical, the gear blank or blanks are mounted upon a spindle rotatably supported at one end in massive bearings in the base of the machine. In some cases no outer support for the work arbor is required, but in those cases wherein a stack of gears, or a gear on a shaft, is to be cut, the free end of the work spindle is supported by an outer bearing adjustably mounted upon a stanchion which is also supported upon the base of the machine.

Supporting the work arbor at its outer end minimized the tendency toward excessive deflection of the otherwise unsupported free end of the arbor or shaft but did not, it will be seen, eliminate the unavoidable compression of the parts incident to the cutting pressures, and an error is introduced in the machining operation which at once is reflected in the cut gear and apparent by gages and noisy operation.

A primary object of the invention, is to compensate and nullify the effects of compression or yielding of the parts as may occur due to the reactionary forces of the tooling operation whereby a relatively wide face gear or a stack of gears may be cut in such manner that every portion thereof will correspond in diameter and shape to a predetermined dimension and precisely with that of any other portion of the finished workpiece.

In machines operating on the vertical cutting principle a massive stanchion supports a translatable saddle and tool head which in turn carries the cutter spindle upon which the cutter is mounted. This cutter stanchion is mounted upon guideways for movement toward and away from the work spindle whereby various sizes of gears may be cut.

For convenience in manufacturing such a machine, graphically represented as U-shaped, each leg or stanchion is manufactured independently and assembled upon the base member at opposite sides of the work spindle. The manufacturing and assembling of a machine for the cutting of accurate gears etc., necessarily requires infinite care and skill to insure that the parts, when assembled, are in perfect alignment. Heretofore, it has been customary to fit the cutter stanchion to the ways on the bed of the machine and thereafter fit the work arbor supporting stanchion to the bed of the machine in a position corresponding in two vertical planes precisely with the position of ways on the cutter stanchion, and in a position such that the axis of the outer bearing or support for the work arbor is coaxial with the main work spindle. Thus, the assembling of a machine required great care and accurate work, consumed a large amount of time and meant the shimming up or scraping of various surfaces in order to bring about the necessary precision in alignment, all of which added materially to the cost of the machine.

Accordingly, a further aim of the present invention is to greatly simplify the problem of initially aligning or realigning cooperating elements and to render available a gear cutting machine in which an infinite degree of accuracy may be initially built into the machine and thereafter maintained in a simple effective manner.

Another disadvantage existing in the prior machines arises due to the fact that the outer work support and stanchion was frequently removed when cutting large gears. Each time the machine was set up for the cutting of a relatively small gear, or a stack of small gears requiring the outer support for the work spindle, it was necessary for the operator to replace the stanchion and go through the laborious and tedious operation of realigning the work stanchion to bring the axis of the work in exact parallelism with the direction of feed movement. The present invention further aims to overcome that difficulty and to enable the operator to expeditiously align the work supporting arbor with respect to the line of travel of the rotating cutter, or to make suitable adjustments thereof to compensate for distortion or yield in the parts under load, to obtain, with the mathematical precision necessary, finished workpieces of a predetermined size and configuration.

In carrying out the objects of the invention it is proposed to construct the support for the outer bearing of the work spindle in two parts, one part closely fitting the ways upon the stanchion so as to be adjustable thereon for different lengths of work arbors, and the other part fitted with bearing means accurately supporting the work arbor on all sides, or fitted with an adjustable center for use when the workpiece is held between centers. Complemental guideways and bearing surfaces are provided between the two members of the outboard support, arranged in a plane disposed at an angle to the axis of the bearing or adjustable center. Thus, by sliding the parts relative to each other the axis of the bearing may be shifted a few thousandths toward or away from the guideways of the main stanchion to correct or make allowances for errors in alignment or for the compression of the parts under load. In this way the bearing portion and its immediate supporting member of the work arbor support may be carefully and accurately adjusted as a complete unit, minute fractional parts of an inch to afford the necessary compensation, the large guide and bearing surfaces between the bearing unit proper and its complement affording an extremely rigid and solid construction effectively resisting any tendencies toward lateral shift or twisting action incident to the tooling forces acting at the opposite side thereof.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2 is a schematic diagram of certain cooperating elements of a hobbing machine better illustrating the direction of the tooling forces and the direction in which compensation may be made to nullify the effects of such forces.

Figure 3 is an enlarged detailed view partly in section of a work arbor support, illustrating a preferred manner of effecting compensatory adjustment of the bearing or arbor supporting portion proper.

Figure 4 is a plan view of the arbor support illustrating the interlocking connection of the bearing surface between the bearing proper and its complement and also a construction wherein the entire arbor support may be adjusted laterally minute distances.

Figure 1:
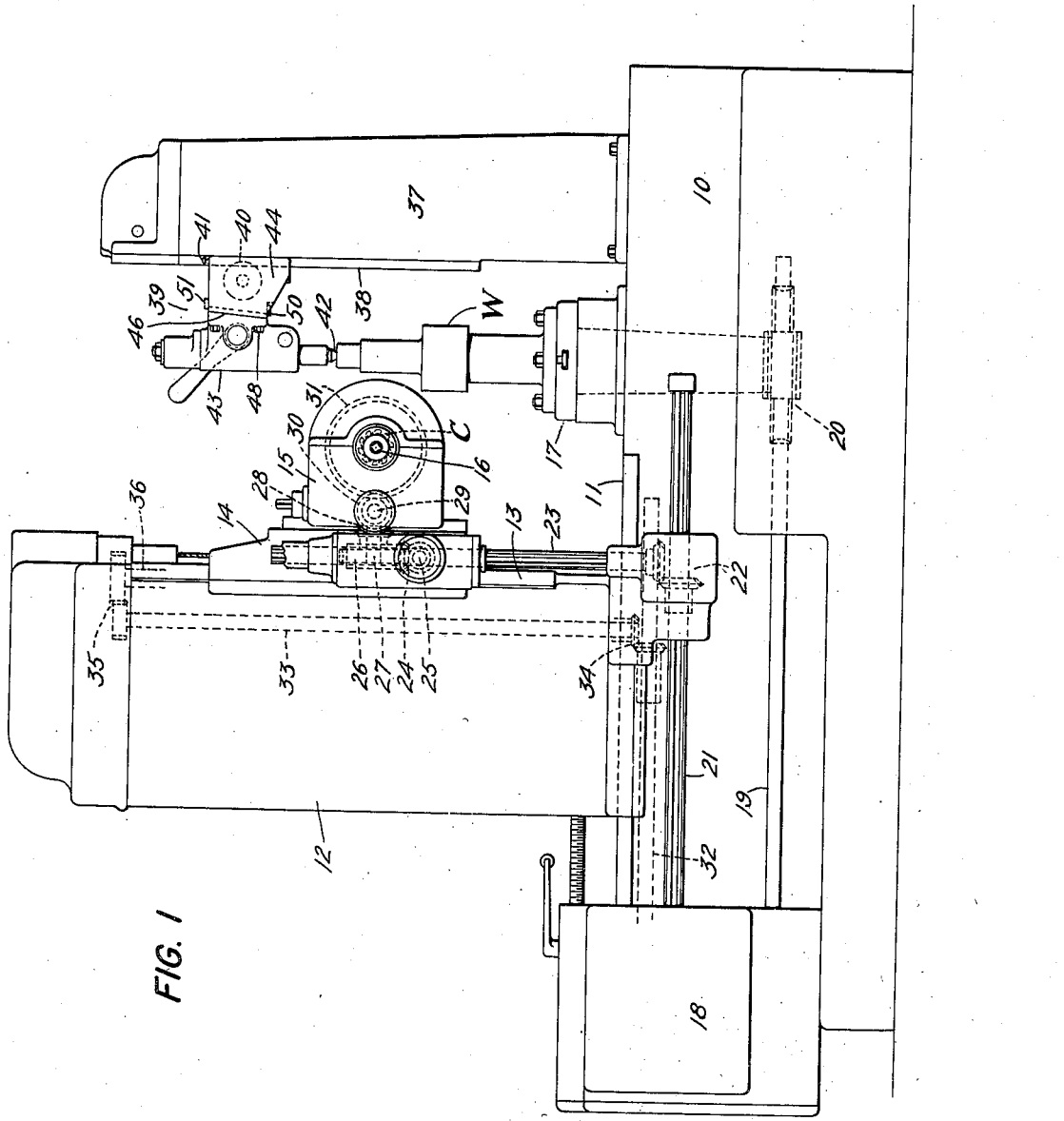
Figure 1 is a side elevation of a hobbing machine embodying the present invention.

Referring more particularly to Figure 1 of the drawings, the machine therein disclosed comprises essentially base member 10 provided on its upper surface with a pair of rectangular guideways 11 upon which is mounted for movement therealong a stanchion 12. The stanchion 12 is likewise provided on its forward face with a pair of rectangular guideways 13 upon which is mounted a saddle member 14 for vertical adjustment. In the embodiment shown, a tool head 15 is pivotally mounted to the saddle 14 on an axis perpendicular to the path of translation of the saddle and has rotatably supported therein a cutter spindle 16. The base member 10 also supports a rotatable work table 17 upon which is mounted a work blank W to be operated upon by the cutter carried in the vertically movable tool head 15.

As hereinbefore mentioned the rotation of the work table 17 is coordinated with the rotary movements imparted to the cutter spindle 16 and is effected through a system of gearing located in the gear box 18. Inasmuch as the means for driving the various elements of the machine forms no part of the present invention a detailed description and illustration thereof is thought unnecessary. Suffice it to say that a shaft 19 leading from the gear box rotates the table 17 through the medium of the worm and worm gear drive 20 housed within the base member 10. Another shaft 21 leading from the gear box 18 drives the bevel gears 22 which in turn drive a splined shaft 23 that translates bodily with the stanchion 12. Power is taken off the splined shaft 23 by means of a pair of bevel gears 24 to a worm shaft 25, thence through worm and worm gears 26 to shaft 27 arranged concentrically with the axis of rotation of tool head 15, to beveled gears 28, pinion shaft 29 and pinion 30. The pinion 30 in turn drives a gear 31 mounted upon the spindle 16 and by which the cutter C is driven. A third shaft 32 leading from the gear box 18 drives another vertical shaft 33 through beveled gears 34 which in turn drive the gears 35 and screw feed mechanism 36 at a speed which has a definite relation with the speeds of rotation of the cutter workpiece.

The machine so far described may be used for the cutting of gears bolted directly to the table 17, but where a stack of gears are to be cut the blanks are mounted upon an arbor driven by the table 17, hence an outer support for the work arbor must be provided to give it the necessary support of its outer end. For that purpose an auxiliary stanchion 37 is bolted or otherwise secured to the base 10 and is provided at its forward face with vertical guides 38. An outer bearing support indicated generally by the numeral 39 is mounted upon the guides 38 and is normally clamped thereto in a preselected vertical position by means of the clamp 40 and a cooperating adjustable gib 41. In Figures 1 and 3 of the drawings the outer support 39 is illustrated equipped with an adjustable center 42. Heretofore, difficulty has been encountered in accurately locating the axis of the center 42 with respect to the face of the guideways 13 upon the main stanchion, so that the direction of feed and the cutter C will at all times be parallel to the axis of the workpiece. The difficulty in obtaining perfect alignment of these elements has been further compounded due to the fact that the misalignment that exists, occurs between the non-translatable table 17 and a movable cutter element C which in turn is mounted upon an element 12 that is not fixed in space nor is it the same element to which the non-translatable table 17 is secured.

Referring to Figure 2 of the drawings, the line 11 represents the top face of the ways on the bed upon which the cutter stanchion 12 is shifted and the line 13 indicates the forward face of the ways on the stanchion 12 upon which the tool slide 15 is vertically translated. The line c represents the line of movement of the cutter which is parallel to the face 13. The line w represents the axis of rotation of the work table 17 and the line a is the center line or axis of the outer bearing support. Thus the problem arises in aligning a movable center a with a fixed center w and in aligning the axis a, w with the line of movement of the cutter so that the distance marked x in Figure 2 equals the distance marked y in any given position of the stanchion 12. Heretofore, parallelism has been attempted by shimming up the underside of the auxiliary stanchion 37 and/or by placing tapered wedges at the side of the arbor bearing in the outer support 39. Such attempts have failed, however, to produce the high degree of accuracy necessary for in each instance the shims or wedges reduce the effective bearing surface between the parts to a small fraction of that originally intended and necessary, and, moreover, each time the auxiliary stanchion was removed, as for example when it is desired to cut a large gear, the removal of the stanchion necessarily destroyed the wedge or shim adjustment and when the stanchion was replaced it was necessary for the user to repeat the tedious process of realigning the support all over again.

In the embodiment of the invention herein disclosed, the disadvantages and inherently unsatisfactory prior methods of making corrections for error in alignment do not exist. Referring more particularly to Figures 3 and 4 of the drawings, the outer support 39 consists of two main parts, 43 and 44. The part 43, is the bearing block proper and houses the complete bearing whether it be in the form of an adjustable center means 45 as shown in Figure 3 or a simple ring bushing for supporting the arbor or shaft being machined. The other part 44 of the outer support is an arm member, which is fitted accurately to the ways 38 on the face of the auxiliary stanchion 37 and capable of a limited amount of lateral adjustment by means of the gib 41.

The adjacent faces of the members 43 and 44 are provided with interlocking bearing surfaces 46 inclined at an angle of approximately five degrees from the vertical. Accordingly a movement of the bearing member 43 relative to the arm member 44 a distance of one-eighth of an inch, for example, results in a shifting of the axis a, a distance of approximately ten thousandths of an inch toward or away from the parallel lines c or 13. By means of suitable indicators an operator may quickly determine the amount of error that exists in his set-up and by loosening the clamp bolts 48 adjust the bearing member 43 relative to its complement 44 to correct for the existing error.

As shown in Figure 3 the bolts 48 have a threaded connection with the arm member 44, and a comparatively loose fit in the bearing block 43, in order to permit relative movement between the two members. In practice it has been found that the amount of endwise movement given to the bearing block 43 is comparatively small and by boring the holes 49 in the bearing block an eighth of an inch, for example, larger than the shank of the bolts 48, sufficient movement may be given to the bearing block to compensate for load deflection or for any error in original alignment of the axis a.

To prevent the bearing block from sliding upon release of the clamp screws, headed screws 50 and 51 are provided which have a threaded connection with the arm member 44 and overlie each end of the bearing block 43. These screws therefore, act as stops preventing untoward shifting of the bearing block and moreover provide an effective means for imparting micrometer-like adjustment to the bearing block relative to the arm 44. For example, if one-eighth of an inch endwise movement of the bearing block effects a lateral shift of the axis a ten thousandths of an inch, a complete turn of one of the screws 50 and 51 (assuming standard screws having twenty threads per inch are used) will move the bearing block laterally .004 of an inch or but a fractional part of its maximum movement. A corresponding small degree of lateral shift may be given to the axis a if the screws are given part turns, and in that way the user may effect exceedingly fine adjustments to compensate for such compression and deflection of the parts resulting from the tooling pressures, to the end that gears or splines, perfect as to size and shape, may be cut.

Each time the work support 37—39 is removed and later replaced as a unit, the user may, by utilizing the same adjusting means, quickly and accurately realign the bearing block without recourse to shims and wedges. Also by adjusting the arm gib means 41 and the clamp means 40, adjustment of the bearing block may be made in a lateral direction perpendicular to the direction of adjustment afforded by the inclined surfaces 46, and so correct for any error in that direction.

In making either of the above adjustments the bearing block assembly 43 is shifted as a complete unit and all annular bearing surfaces therein provided for either directly journaling a shaft or arbor or for supporting an adjustable center, are not reduced in size or area such as occurs when the expedient of a shim or wedge is used to cant the bearing over against one of the side walls of the bracket. The present construction, it will be apparent, does not weaken the bearing proper in any way, and when the interlocking parts of the support are clamped in adjusted position, they have the strength and rigidity of a one piece support with the added advantages of extremely fine and controlled method of effecting adjustments.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A support for supporting the free end of a driven work arbor of a gear hobbing machine tool in which the forces of the translatable cutter acting against the workpiece tends to spring the free end of the work arbor out of alignment comprising a supporting arm member adjustable on guideways to suit the approximate length of the work arbor, a bearing block member secured to said arm member, said bearing block having bearing means therein adjustable to suit the exact length of the work arbor, said arm and bearing block members each being provided with complementally inclined bearing faces, said faces being inclined at a low angle to the normal axis of the work arbor; screw means for adjusting said bearing block member axially of the work arbor and simultaneously toward the plane of translation of the cutter minute distances sufficient to compensate for the counter movement of said bearing when subjected to the pressure of the cutting operation; means for clamping said bearing block member to said arm member; and means positively limiting the axial movement of said bearing block to a definite amount when unclamped from said arm member.

2. A support for supporting the free end of a driven work arbor of a gear hobbing machine in which the pressure of the translatable cutter against the work tends to spring the axis of the work arbor out of alignment, comprising a supporting arm member adjustable on guideways on the machine to suit the approximate length of the work arbor, a bearing block member secured to said arm member, said bearing block having arbor centering means therein axially adjustable to suit the exact length of the work arbor, said arm and bearing block members each being provided with complemental bearing faces inclined at an angle to the axis of the work arbor; means for adjusting said bearing block member in the general direction of the axis of the work arbor and simultaneously minute distances laterally toward the cutter to compensate for the spring and compression of the parts incident to the reactionary pressure of the cutting operation, said adjustable centering means repositioning itself in said bearing block in accordance with the changed axial position thereof; and means for clamping said bearing block in adjusted position to said arm member.

WILLIAM F. ZIMMERMANN.